Figure 3:
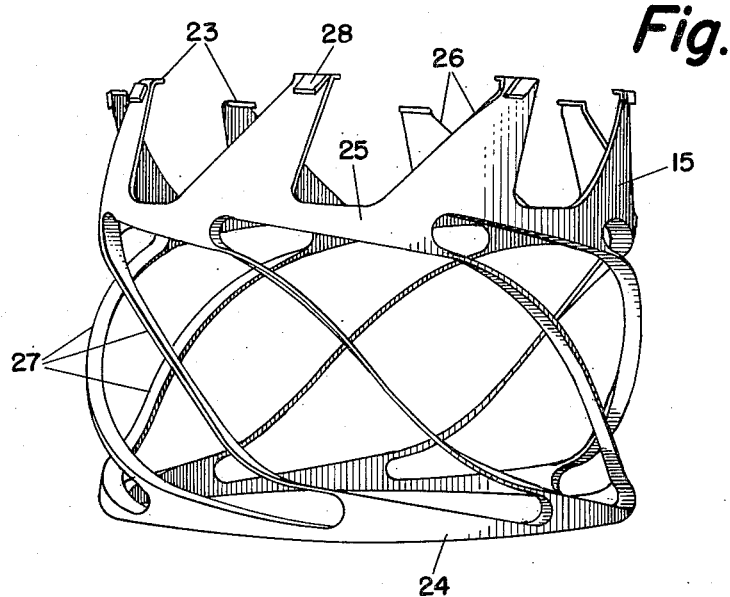

June 12, 1962 A. J. GRANDY ETAL 3,038,713
MULTI-LEAD HELICAL SPRING
Filed Oct. 8, 1959 3 Sheets-Sheet 1
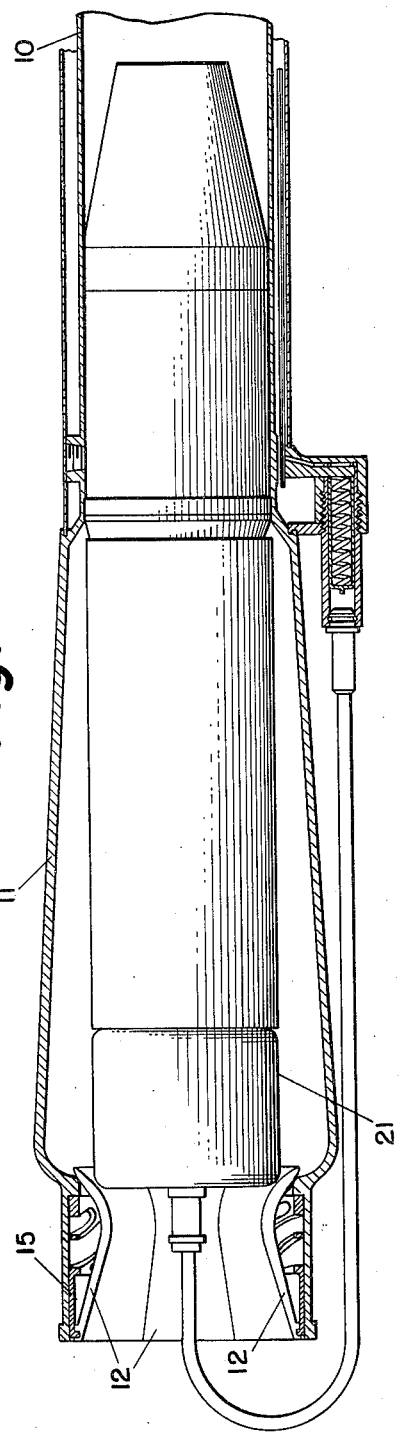
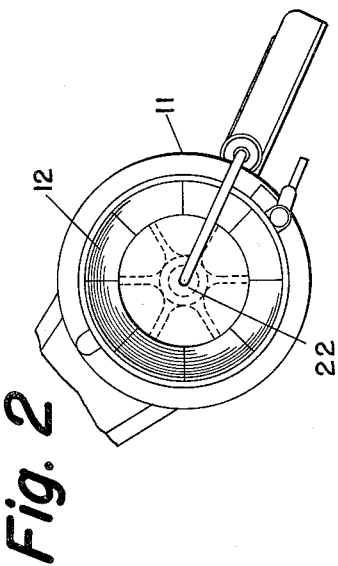
INVENTORS
ANDREW J. GRANDY
CHARLES A. GREENWOOD
BY
ATTORNEYS June 12, 1962  A. J. GRANDY ETAL  3,038,713
MULTI-LEAD HELICAL SPRING Filed Oct. 8, 1959  3 Sheets-Sheet 2

INVENTORS
ANDREW J. GRANDY
CHARLES A. GREENWOOD

ATTORNEYS

June 12, 1962  A. J. GRANDY ETAL  3,038,713
MULTI-LEAD HELICAL SPRING

Filed Oct. 8, 1959  3 Sheets-Sheet 3

INVENTORS
ANDREW J. GRANDY
CHARLES A. GREENWOOD
BY S. J. Rotondi, A. J. Dupont
& H. R. Johns
ATTORNEYS

United States Patent Office 3,038,713
Patented June 12, 1962

3,038,713
MULTI-LEAD HELICAL SPRING
Andrew J. Grandy, North Hills, and Charles A. Greenwood, Eddington, Pa., assignors to the United States of America as represented by the Secretary of the Army
Filed Oct. 8, 1959, Ser. No. 845,294
2 Claims. (Cl. 267—1)
(Granted under Title 35, U.S. Code (1952), sec. 266)

The invention described herein may be manufactured and used by or for the Government for governmental purposes without the payment to us of any royalty thereon.

This invention relates to springs and more particularly to a multi-lead helical spring sleeve which is light in weight, occupies a minimum of space, operates with little or no friction, exerts a pressure which is substantially uniform throughout an annular area, and is readily manufactured and assembled.

This improved spring is especially useful where a plurality of segments are to be slidably retained within a cylinder. It is illustrated as applied to the expending nozzle of a recoilless rifle such as that disclosed by a copending application of Albert Benditt and C. Walton Musser, Serial No. 831,446 filed Aug. 3, 1959, now U.S. Patent No. 2,949,061 for "Recoilless Rifle With Expanding Nozzle." It is to be understood, however, that it has uses other than those indicated above.

The spring of the present invention was developed to overcome certain difficulties encountered in the use of the springs heretofore available. Among these difficulties was the lack of uniformity in the pressure exerted by the spring. This resulted in cocking of the segments and increased friction. Another difficulty was that such springs had to be forcibly confined during their compression, thus further increasing the frictional losses. Other objectional features were the size and weight of the spring and the difficulty of coupling it to the parts positioned by it. The herein described spring minimizes or obviates all these objectionable features.

The invention will be better understood from the following description when considered in connection with the accompanying drawings and its scope is indicated by the appended claims.

Figure 4:
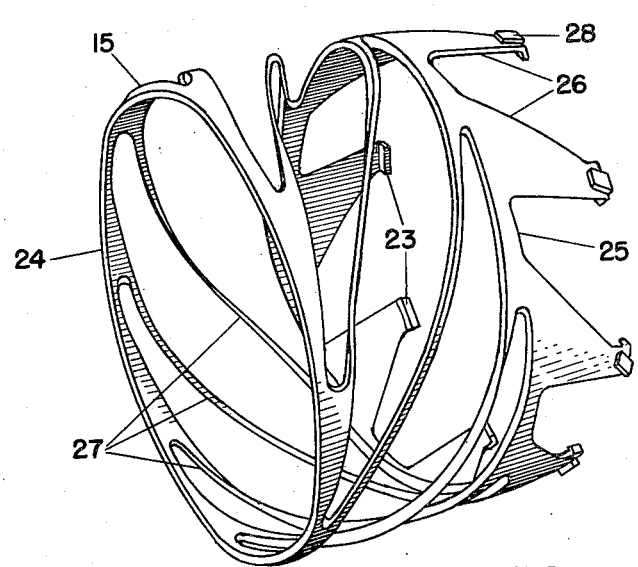
Figure 5:
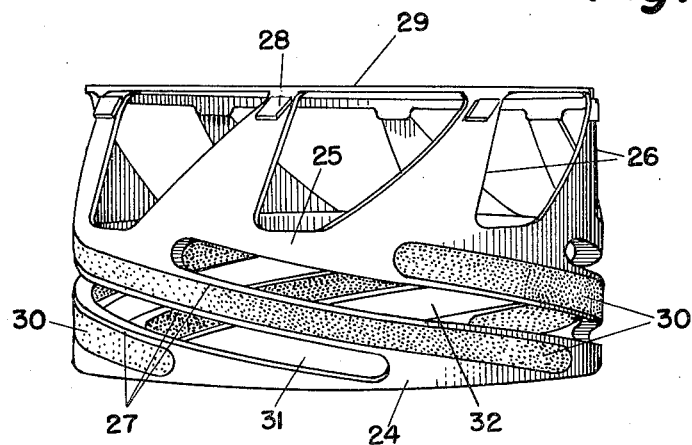
Figure 6:
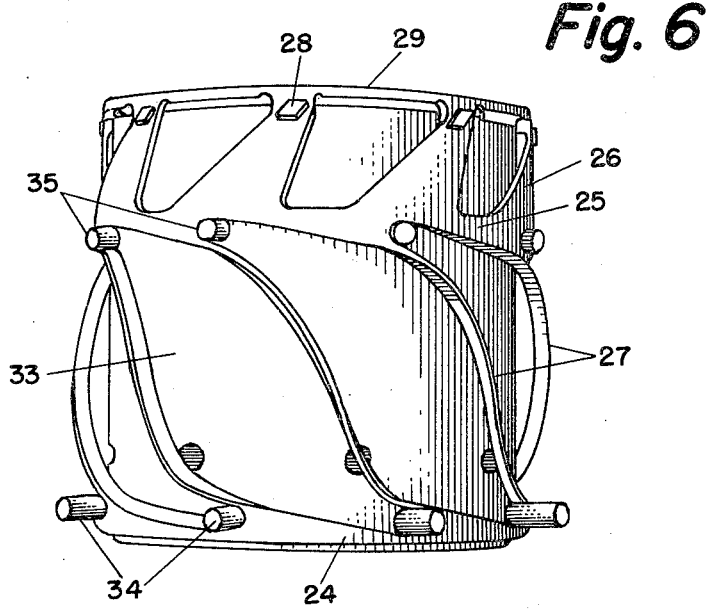

Referring to the drawings:

FIGS. 1 and 2 illustrate the application of the spring to the expanding nozzle of a recoilless rifle, FIGS. 3 and 4 are different views of the completed spring, and FIGS. 5 and 6 are explanatory diagrams relating to the manufacture of the spring.

FIGS. 1 and 2 illustrate a recoilless gun including a barrel 10, a chamber 11, and a plurality of segments 12 which are biased to their illustrated position by the spring 15 which is shown in detail by FIGS. 3 and 4. When a round, such as a cartridge 21, is inserted into the chamber 11, the spring 15 is compressed and the segments slide forwardly and outwardly. When the round is in place, the spring 15 forces the segment rearwardly bringing them together to form a nozzle and to lock the round in place.

It will be noted that each of the segments 12 has a groove near its rear end. The spring 15 has a plurality of inwardly bent ends 23 (see FIGS. 3 and 4) which extend into these grooves, there being one such bent end to each of the segments 12.

The spring 15 includes a forward rim 24 and a rear rim 25 from which there extends a plurality of extensions 26 terminating in the bent ends or radial inward projections 23. Interposed between the rims 24 and 25 are a plurality of helical springs 27, one for each of the segments 12. On the exterior of the ends of the extensions 26 is a raised part or radial outward projection 28 which is provided as a bearing surface for movement of the spring. It will be observed that this spring occupies a minimum of annular space. It has been found to operate with very little friction.

The spring 15 is manufactured from a cylindrical piece of solid metal in either of two ways. In one case, the center of the cylinder is bored out to the proper internal dimension, the spaces between the extensions 26 and between the helical springs 27 are cut out, the spring is heat treated as hereinafter explained and the rim 29 is removed by grinding. This method of manufacuring the spring has the disadvantage that certain of the helical springs 27 have to be supported by a cement 30 (see FIG. 5) while slots 31 and 32, for example, are cut.

In the preferred method of manufacturing the spring, the metal between the springs 27 and between the projections 26 is first removed and the center of the cylinder is then bored out to the required internal diameter.

In either case, the spring is placed on a form 33 (see FIG. 6) with the pegs 34 engaging the rim 24 and is stretched enough to permit insertion of the pins 35 immediately below the rim 25. In this state, the spring is heat treated after which the rim 29 is removed and the spring is taken from the form.

As thus constructed, the spring has the advantage of a one-piece construction and provides positive alignment of the individual nozzle segments with each spring element, thereby providing the largest component of force normal to the line of action. It affords the maximum working height for a spring of this type and remains operable in case of the breakage of one or more of the helical elements.

As shown in the drawing each of the helical members 27 has its ends attached to one of the rims 24 or 25 spaced 45° from the ends of adjacent helical members on the same rim, there being a total of 8 helical members in the embodiment shown. FIGS. 5 and 6 show how the extensions 26 may be made thinner and therefore more flexible radially than are the helical members. FIG. 2 shows a total of 8 segments 12 thus allowing one extension 26 for each segment. Those skilled in the art will understand the claimed spring to be adapted for other uses than that illustrated.

We claim:

1. A multi-lead helical spring of unitary construction comprising a pair of rims, a plurality of helical members extending between said rims and of rim material, each helical member when compressed being of less than 180° in angular extent and longitudinally overlapping substantial portions of an adjacent helical member on each side of each helical member, unitary extensions extending generally longitudinally from one of said rims, there being one such extension for each helical member extending longitudinally away from said rim and helical members, and a radial projection on an end portion of each extension.

2. A multi-lead helical spring construction according to claim 1 in which there are 8 helical members substantially equally spaced angularly, in which each extension is of radially less depth than said helical members, in which the radial projection is both radially inward and radially outward on each extension, and in which the ends of each helical member are spaced less than 90° apart.

References Cited in the file of this patent

UNITED STATES PATENTS

| | | |
|---|---|---|
| 1,826,415 | Bragg et al. | Oct. 6, 1931 |
| 2,447,319 | De Fourchambault | Aug. 17, 1948 |
| 2,608,752 | Schilling | Sept. 2, 1952 |
| 2,641,439 | Williams | June 9, 1953 |
| 2,668,347 | Garske | Feb. 9, 1954 |
| 2,834,594 | Pietruszka | May 13, 1958 |
| 2,875,779 | Campbell | Mar. 3, 1959 |
| 2,888,258 | Hoffstrom | May 26, 1959 |
| 2,893,717 | Simmons | July 7, 1959 |
| 2,903,242 | Bodine | Sept. 8, 1959 |
| 2,949,061 | Benditt et al. | Aug. 16, 1960 |